United States Patent
Kaplan et al.

(10) Patent No.: US 9,632,663 B2
(45) Date of Patent: Apr. 25, 2017

(54) ADJUSTING IN-STORE MEDIA TO CUSTOMER PREFERENCES

(71) Applicant: Fish Six RC, San Francisco, CA (US)

(72) Inventors: Jonathan Kaplan, San Francisco, CA (US); Stanley Peter Demarta, Pleasanton, CA (US); Carrie Eaton, San Francisco, CA (US); Jay Amando Domingo Llacuna, San Francisco, CA (US)

(73) Assignee: FISH SIX RC, San Francisco, CA (US)

( * ) Notice: Subject to any disclaimer, the term of this patent is extended or adjusted under 35 U.S.C. 154(b) by 75 days.

(21) Appl. No.: 14/161,478

(22) Filed: Jan. 22, 2014

(65) Prior Publication Data

US 2015/0205573 A1  Jul. 23, 2015

(51) Int. Cl.
*G06F 17/00* (2006.01)
*G06F 3/0482* (2013.01)
*G06Q 50/10* (2012.01)

(52) U.S. Cl.
CPC .......... *G06F 3/0482* (2013.01); *G06Q 50/10* (2013.01)

(58) Field of Classification Search
CPC .................. G06F 17/30764; G06F 17/30041
See application file for complete search history.

(56) References Cited

U.S. PATENT DOCUMENTS

| | | | | |
|---|---|---|---|---|
| 2007/0156676 A1* | 7/2007 | Rosenberg | .................. | 707/5 |
| 2007/0220100 A1* | 9/2007 | Rosenberg | .................. | 709/206 |
| 2008/0032723 A1* | 2/2008 | Rosenberg | .................. | 455/466 |
| 2013/0024299 A1* | 1/2013 | Wong | .................. | G06Q 50/12 705/15 |
| 2013/0264385 A1* | 10/2013 | Stoudt | .................. | G06Q 20/34 235/380 |
| 2015/0074003 A1* | 3/2015 | Tickner | .................. | G06Q 30/0645 705/307 |

\* cited by examiner

*Primary Examiner* — Joseph Saunders, Jr.
(74) *Attorney, Agent, or Firm* — Artegis Law Group, LLP (57) ABSTRACT

The disclosure provides techniques for adjusting in-store media according to customer preferences. A customer's presence or purchase is detected at an establishment, and a system at the establishment retrieves information on media preferences of the customer. A media backend then matches the customer preferences to media items (music tracks, images, videos, etc.), and the matching media items are played, displayed, or broadcast at the establishment. If multiple customers are present at the establishment or make orders, the media backend may order media items that match the customers' preferences in first-served order, or based on a ranking of the customers relative to each other or on the content of the media items themselves.

16 Claims, 5 Drawing Sheets

ADJUSTING IN-STORE MEDIA TO CUSTOMER PREFERENCES

BACKGROUND OF THE INVENTION

Field of the Invention

Embodiments of the present invention relate generally to in-store media systems and, more specifically, to an approach for implicitly adjusting in-store media, such as the music played in-store, to customer preferences.

Description of the Related Art

A modern business, such as a restaurant chain, oftentimes provides in-store music as part of an overall service offering. For example, the business may continuously play background music received over traditional radio. As another example, the business may install a jukebox, a coin-operated device that plays selected music tracks.

Recently, streaming music services have become popular. Some streaming music services provide comprehensive libraries of licensed music titles, from which playlists, i.e., lists of music tracks, may be compiled and streamed over the internet. That is, operators of an establishment select music tracks to include in the playlists, and the streaming music service streams such music tracks for playback at the establishment. Similarly, an operator can select from a variety playlists (selected by artist, genres, etc.), and stream music from these playlists within a retail establishment in order to create a given atmosphere or ambience. In addition, some streaming music services permit customers to select desired music tracks to be streamed, extending the music available from a jukebox to a larger library. For example, customers may use a mobile device application to make explicit selections of music tracks from available music tracks, and the streaming music service may then stream such selected music tracks for playback at the establishment.

SUMMARY OF THE INVENTION

One embodiment includes a method for selecting media for playback, display, or broadcast at an establishment. This method may generally include detecting one of presence of a customer at the establishment and a purchase by the customer at the establishment. The method may further include, in response to detecting the presence of the customer or the purchase: determining media preferences associated with the customer, and identifying at least one media item corresponding to the determined media preferences to playback, display, or broadcast at the establishment.

Other embodiments include, without limitation, a computer-readable medium that includes instructions that enable a processing unit to implement one or more aspects of the disclosed method as well as a system configured to implement one or more aspects of the disclosed method.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments disclosed herein provide techniques for customizing customers' in-store experiences with media (e.g., music, images, videos, etc.) based on customer preferences. For example, consider a restaurant that permits customers to place orders online. In such a case, the restaurant could provide a customer with a barcode graphic, such as a quick response (QR) code that can be scanned to fulfill the order at the restaurant. When the QR code is scanned at the restaurant, an order fulfillment system may retrieve, from an order-processing backend, order details associated with the QR code. Additionally, the fulfillment system may retrieve information related to the music preferences of the customer. The music preference information may include a favorite band, artist, genre, time period, or other information used to identify a music track to stream and play for the customer. A customer's music preferences may be determined in various ways, such as by explicitly asking the customer during a registration process, extracting the music preferences from an online profile belonging to the customer, matching a customer's age to music from an associated time period, etc. In addition, music preferences may be gleaned from a mobile device, e.g., by obtaining a music playlist or custom ringtones on the mobile device. Other metadata that may indicate preference include specific albums, movies, books, favorite instruments, hobbies, etc. Even overall mood may be gleaned based on keyword analysis of the customer's recent messages and email. However identified, the preferences may used to identify one or more music tracks for playback at the establishment or used to customize other aspects of a given customers experience.

After retrieving the customer music preferences, the order fulfillment system transmits a message to a streaming music backend, requesting that a music track matching the music preferences be added to a queue of music tracks to be streamed. In one embodiment, the queue may include a set of media tracks from which the streaming music backend randomly chooses a next media track. The queue may initially be populated with music tracks from a playlist. The streaming music backend may track the currently playing media track as well as the queue of media tracks (e.g., two to four media titles), which may be pre-cached for next play. The next media track to be streamed for playback (becoming the currently streamed song) is chosen from the queue, and may be randomly selected with a weighted chance of being picked based on a number of "votes" associated with the music track.

The streaming music backend may be a streaming music service which provides access to a comprehensive library of licensed music tracks. Given the customer music preferences, the streaming music backend first determines whether those preferences match a music track already in the queue of music tracks. For example, a music track by the customer's favorite band may have already been added to the queue for a previous customer who liked the same band. If a matching music track is identified in the queue, the streaming music backend increases a vote on the matching music track. Continuing the previous example, the music track added for the previous customer may be initialized to have a vote of two (or one, or any other number), indicating that one customer likes the music track. When the streaming music backend determines that the current customer's music preferences match the same music track, the streaming music backend may increase this vote by one to three (or by any other increment).

If no matching music track is identified in the current in-store playlist, then the streaming music backend identifies a music track matching the customer's music preferences to add to the in-store playlist. In one embodiment, the track is identified from a playlist of titles already associated with the restaurant. Doing so helps ensure the music track that is chosen is appreciated by the customer and also fits the current ambiance of the restaurant. For example, the restaurant may approve one playlist for a lunch service and another for a dinner or late-night service. Similarly, the playlists could be tailored for times of year, e.g., the availability of Christmas music during November and December months. The streaming music backend may add the identified matching music track to the queue of music tracks with a given initial vote, such as a vote of two. However if no other customer music tracks are in the queue, the streaming music backend may fade out a music track currently playing and then begin playing the matching music track.

In another embodiment, the music may be streamed according to a ranking of the customers. For example, the streaming music backend may prioritize some customers (celebrities, frequent customers, etc.), and place a higher vote on their music tracks. In yet another embodiment, the music tracks may be streamed based on uniqueness of the music tracks. For example, if a customer prefers one band that is commonly preferred and another customer prefers a less commonly preferred band, the streaming music backend may rank the uncommon choice higher and provide, e.g., a higher vote. Doing so may seem counter intuitive, but may result in a more memorable experience for the customer who prefers the uncommonly preferred band. On the other hand, the customer who prefers the commonly preferred band may not even notice if a music track by such a band is played, as music tracks by the commonly preferred band may often be included in playlists.

Note, although a restaurant is used herein as a representative example of an establishment, this disclosure is not limited to any particular commercial enterprise, as embodiments of the invention may generally be adapted for a variety of environments where music is played to create part of an atmosphere or ambience for customers. Similarly, although music is used herein as a representative example of in-store media, this disclosure is not limited to any particular form of media. In general, embodiments of the invention may make any adjustments to a customer's experience in response to detecting the customer's presence or a purchase made by the customer. For example, in response to detecting the customer's presence or purchase, an in-store media system may display artwork, pictures, videos, or other information; play sound effects; etc. specific to the customer. This process may generally be automated with no user (customer/store operator) interaction required for the system to select and display, play, or broadcast, the media. That is, the process may be seamless, and the media may be selected and played without user input.

In the following description, numerous specific details are set forth to provide a more thorough understanding of the present invention. However, it will be apparent to one of skill in the art that the present invention may be practiced without one or more of these specific details.

Figure 1:
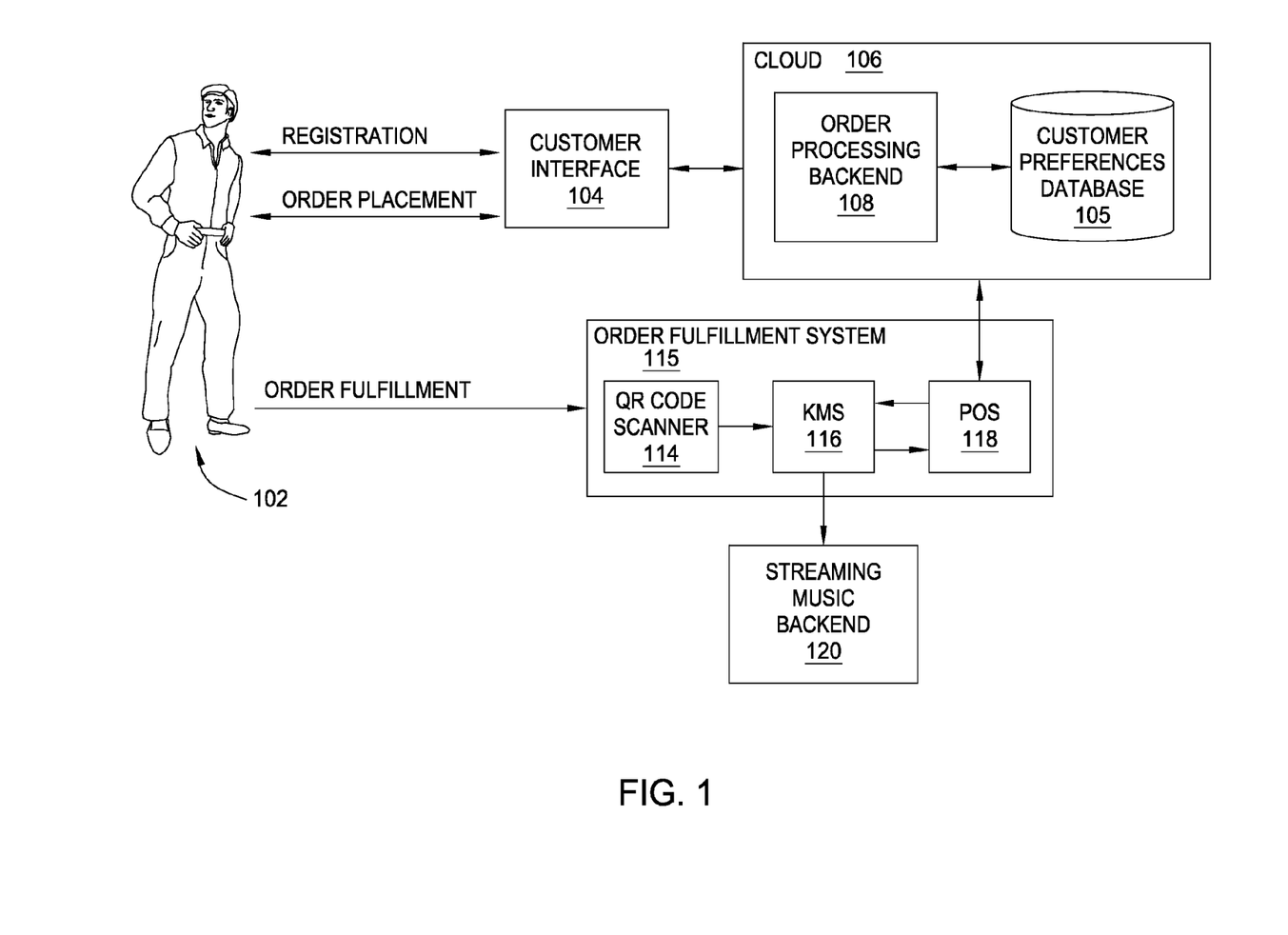
FIG. 1 is a block diagram of an order processing and in-store music system configured to implement one or more aspects of the present disclosure.

FIG. 1 is a block diagram of an order processing and in-store music system configured to implement one or more aspects of the present invention. As shown, the system includes a customer interface 104, an order processing backend 108 and customer preferences database 110 in a computing cloud 106, an in-store order fulfillment system 115, and a streaming music backend 120. Order fulfillment system 115 includes a scanner used to scan a barcode (or other graphic) such as a QR code scanner 114, a kitchen management system (KMS) 116, and a point-of-sale system (POS) 118. Order fulfillment system 115 may be installed at an establishment, which may be a brick-and-mortar establishment (e.g., a restaurant) or a mobile establishment (e.g., a food truck). Note, although depicted as separate components, the functionality of the components illustrated in FIG. 1 may be combined in other embodiments.

Customer interface 104, cloud 106, order fulfillment system 115, and streaming music backend 120 communicate over a data communications network, such as the internet. Customer interface 104 may be a website, a mobile application, app, or other executable program which provides a customer-facing user interface allowing a customer 102 to register an account, as well as to view and select virtual items to include in an order. As used herein, "virtual items" refers to items that customer 102 selects from a menu provided by customer interface 104. The virtual items may represent generic categories of items (e.g., "sandwich," "beverage," etc.) that can be mapped, when the customer 102 visits a restaurant, to specific items (e.g., specific sandwiches, beverages, etc.) present in the inventory of the restaurant. The specific items can then be presented to the customer 102 to fulfill the order. This process of mapping virtual items to actual items is described in greater detail in U.S. patent application Ser. No. 14/085,607, which is incorporated by reference herein in its entirety.

"Registration" generally refers to a process of creating an account which can then be used to place orders online. The registration process may include supplying billing information, configuring user preferences, updating profile details, and so forth. In particular, music preferences information may be collected during registration and stored in customer preferences database 110. Illustratively, the customer preferences database 110 is stored in computing cloud 106, but the customer preferences database 110 may also be stored in any other remote or locally accessible system. One advantage of storing the customer preferences database 110 in the cloud is that this enables the preferences to be delivered to any establishment that the customer visits, providing a similar experience to the customer regardless of location.

In one embodiment, the registration process may include an option for the customer 102 to specify a favorite band, artist, music genre, time period, song, etc., or a combination of these, via the customer interface 104. The specified music preferences are then stored in the customer preferences database 110. After registration, the music preferences information, and other preferences, may also be updated in the customer's account via the customer interface 104. Note, the music preferences information entered by the customer 102 need not be stored as entered, and may instead be used to identify a corresponding specific band, artist, genre, time period, song, etc. in a database storing labels for music tracks, with the specific information being stored in the customer preferences database 110. For example, the customer 102 may enter "rock," which may be associated with a "rock and roll" label that is ultimately stored in the customer preferences database 110. In addition to a customer providing their express preferences, customer music preferences may be obtained in other ways. For example, the registration may extract music preferences from an online profile belonging to the customer, match the customer's birth date to music from an associated time period, infer music preferences from the customer's address or ZIP code, or other demographic markers. For example, the customer may provide social network account information during the registration process, and music preferences may be extracted from the customer's social network profile. In addition, music preferences may be gleaned from a mobile device playlist or ringtones. As discussed, other metadata that may also be used as preference indicators including specific albums, movies, books, favorite instruments, hobbies, etc., and overall mood may be gleaned based on keyword analysis of, e.g., the customer's recent messages and email.

Order processing backend 108 is a cloud-based web service that receives, stores, and processes orders placed by customer 102 via customer interface 104. Although shown as cloud-based, order processing backend 108 may be any other remotely accessible or local computing system. In addition to the registration process, customer interface 104 and order processing backend 108 also allow customer 102 to place an order and receive a QR code that includes an order number, and potentially other information associated with the order. The QR code may then be scanned at a restaurant to fulfill the order, or at least inform the restaurant that the customer is now present within the restaurant. In one embodiment, order processing backend 108 validates orders placed via customer interface 104 and stores orders within an order database with the assigned order numbers. The order processing backend 108 then transmits the order number back to the customer interface 104, which generates the QR code that includes the order number (and any associated information).

The customer 102 may later scan the QR code to fulfill the order, at which time the order fulfillment system 115 also adjusts in-store music according to the customer's 102 music preferences. More specifically, in one embodiment, the QR code scanner 114 scans a QR code presented by customer 102 and extracts data from the QR code. Data extracted from the QR code is passed to KMS 116, which includes hardware and software for order fulfillment, such as computer monitors that allow restaurant operators to track the order process, touch screen devices that allow the operators to input or modify order information, and databases that dynamically update inventory in response to received orders. KMS 116 is configured to parse the QR code data and extract the order number for the customer's order.

KMS 116 then passes the extracted order number to POS 118, which is configured to perform various functions associated with order processing, such as retrieving order details, determining items in the restaurant's inventory matching the order, causing a payment processing backend (not shown) to bill the customer, generating a receipt that may be physically printed and provided to the customer 102 or emailed to the customer 102, among other things. In one embodiment, POS 118 may request order details from order processing backend 108 and provide the extracted order number. In response, the order processing backend 108 may query the order database, using the order number, for information needed to fulfill the order (e.g., specific items ordered, billing information, etc.).

In one embodiment, the order fulfillment system 115 also queries customer preferences database 110 for music preferences of the customer who made the order. Order processing backend 108 then return any information needed to fulfill the order and music preferences information to POS 118. For example, order processing backend 108 may return an extensible markup language (XML) file, or some other serialized representation of data, that includes the order fulfillment information and music preferences information.

At this point, the POS 118 transmits music preferences information back to KMS 116, which then requests that streaming music backend 120 add a music track that matches the customer's music preferences and a current playlist to a queue of streaming music tracks. At any given time, streaming music backend 120 may stream the first music track in the queue. Initially, the queue may include music tracks from a predetermined playlist of music tracks. For example, the restaurant may play streamed music tracks from a given playlist during the daytime and another playlist at nighttime to create different atmospheres. As customer orders are processed, streaming music backend 120 adds music tracks that match the customers' music preferences and the current playlist to the queue based on the presence of a given customer. Finding a match to the customer's music preferences as well as the current playlist ensures that the customers' in-store experiences are customized to include music they appreciate, while preserving the atmosphere of the restaurant. Note, customers do not explicitly request particular music tracks for music tracks consistent with their preferences to be queued for streaming.

Prior to adding a music track to an in-store playlist, the streaming music backend 120 may first determine whether a music track that is already in the queue matches the customer's preferences. If such a matching music track is found, streaming music backend 120 may increase a vote on that music track. As a result, music tracks matching the music preferences of more customers are associated with a higher number of votes. If no matching music track is found in the queue, streaming music backend 120 may determine a matching music track from other available music tracks (e.g., music tracks in the restaurant's custom library or in the comprehensive library of licensed music tracks provided by the streaming music backend 120) and add the matching music track with a vote of two (or any other initial value) to the queue behind other customers' music tracks, as discussed in greater detail below. If no other customers' music tracks are in the queue, streaming music backend 120 may stream the matching music track after fading out the currently playing music track.

Figure 2:
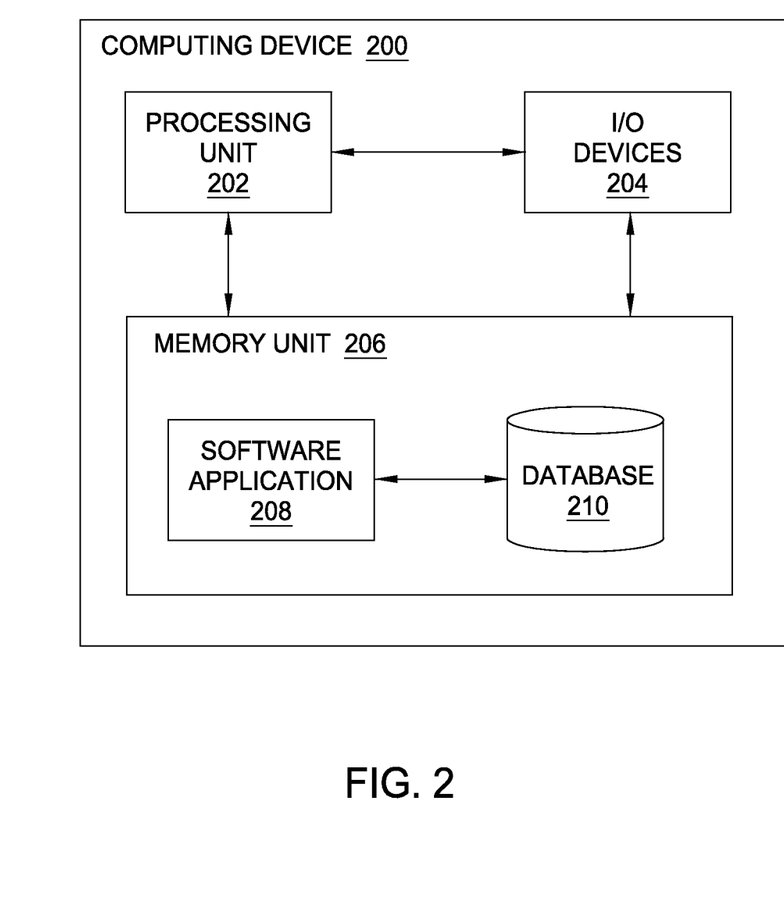
FIG. 2 illustrates an exemplary computer system within the system of FIG. 1, according to one embodiment.

Customer interface 104, order processing backend 108, customer preferences database 110, streaming music backend 120, and order fulfillment system 115, including KMS 116, order board 108, and POS 118 may each be implemented by a computing device or network of computing devices, or by a remote or cloud-based computing device. FIG. 2 illustrates an exemplary computing device 200 that is a component of the system of FIG. 1, according to one embodiment. Computing device 200 may be a physical or a virtual computing device, or a combination of the two. As shown, computing device 200 includes a processing unit 202, input/output devices 204, and a memory unit 206, coupled to one another. Memory unit 206 includes an application 208 that is coupled to a database 210. Processing unit 202 may be a central processing unit (CPU), application specific integrated circuit, (ASIC), or any other data processing element. I/O devices 204 may include devices capable of receiving input, devices capable of generating output, and devices capable of both receiving input and generating output. Memory unit 206 may include any type of memory module or a collection of memory modules capable of storing data. Processing unit 202 executes software application 208, e.g., to store and retrieve data from database 210 (such as store and retrieve music preferences), service web-based requests (receive an online order fulfilled at a restaurant), etc.

As mentioned, computing device 200 may implement one or more of the customer interface 104, order processing backend 108, customer preferences database 110, streaming music backend 120, and order fulfillment system 115, including KMS 116, order board 108, and POS 118 shown in FIG. 1. For example, if computing device 200 implements customer interface 104, then software application 208 may be a web server application that registers customers and processes web requests including orders placed by customers to support the operation of a customer-facing website. Database 210 may store customer preferences, such as music preferences. As another example, if computing device 200 implements streaming music backend 104, then software application 208 may receive customer music preferences, identify music tracks that match the customer music preferences and a current playlist, add the matching music tracks to a queue of music tracks, if necessary, and stream the music tracks in the queue for playback at the restaurant.

Persons skilled in the art will recognize that computing device 200 represents just one exemplary implementation of a component within order processing system 100, and that other implementations also fall within the scope of the present invention. As a general matter, computing device 200 may be any technically feasible type of device configured to implement any of the functionality described herein.

Figure 3:
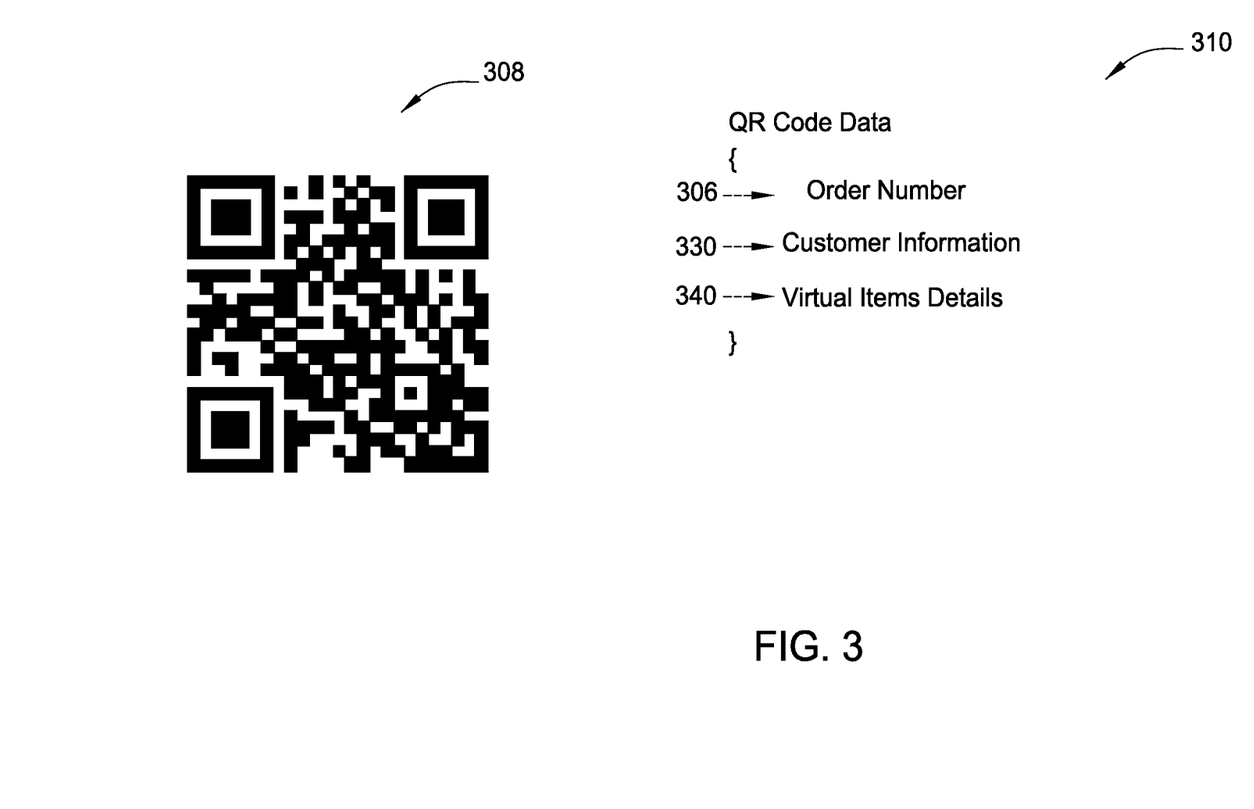
FIG. 3 is a conceptual diagram illustrating order data encoded within a quick response (QR) code, according to one embodiment.

FIG. 3 is a conceptual diagram illustrating order data encoded within a quick response (QR) code, according to one embodiment of the present invention. As shown, QR code 308 includes various black and white regions that may be sized and arranged to encode partial order details 310, including an order number 306. Partial order details 310 may generally reflect a simplified representation of the virtual items associated with an order, and may also include other order-related information as well as customer information.

As shown, partial order details 310 include order number 306, customer information 330, and virtual item details 340. As discussed, after customer 102 scans QR code 308, KMS 116 may extract the order number from the QR code data. This order number is then used to determine customer preferences, which are transmitted to streaming music backend 120 so that a music track that matches the customer's preferences may be queued for streaming (if not immediately streamed). In another embodiment, KMS 116 may also extract partial order details 310 such as the customer information 330 and the virtual items details 340 and populate an order board, which displays orders being processed at the restaurant, with portions of partial order details 310, including customer information 330 and virtual item details 340 (e.g., "Customer X," "Sandwich"). In this fashion, customer 102 may be notified that order 302 was received very shortly after QR code 310 is scanned, and may track the processing of the order.

Figure 4:
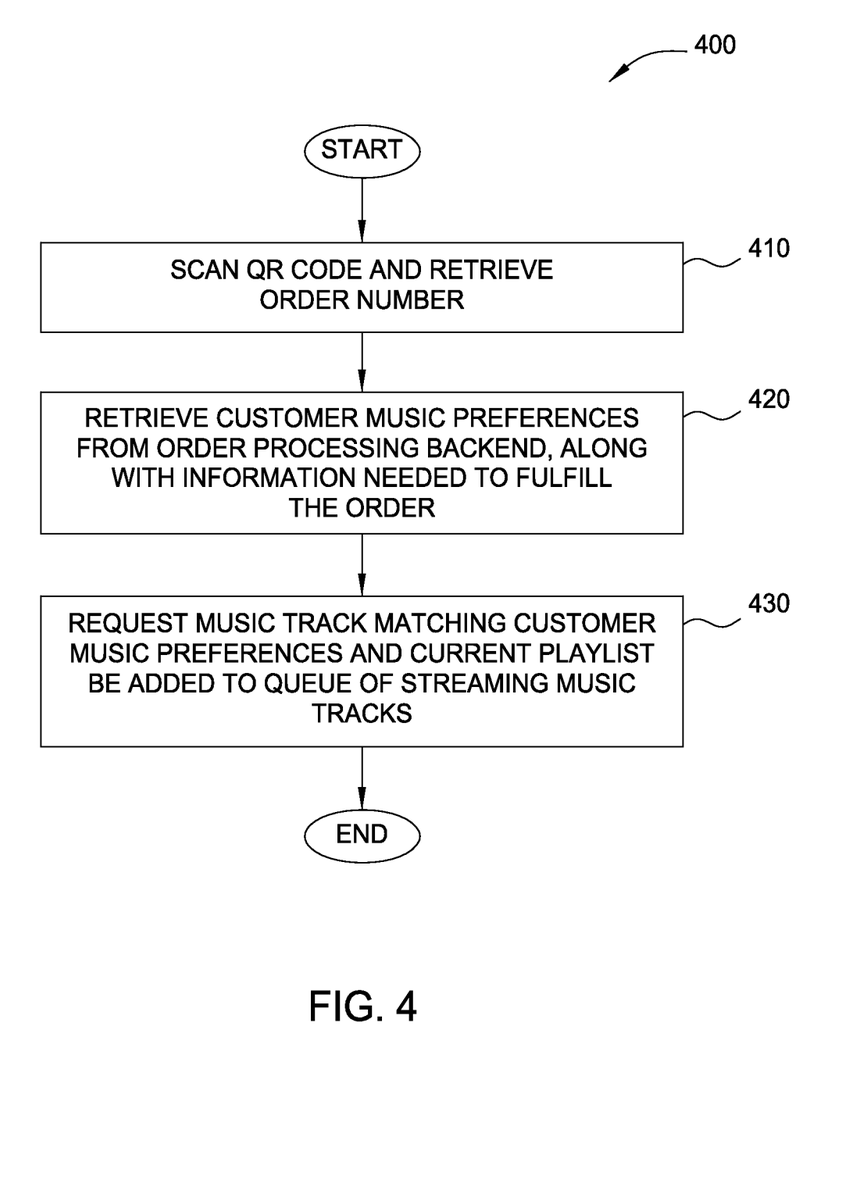
FIG. 4 is a flow diagram illustrating a method for determining customer music preferences and streaming music matching those preferences, according to one embodiment.

FIG. 4 is a flow diagram illustrating a method 400 for determining customer music preferences and streaming music matching such preferences, according to one embodiment. As shown, the method 400 begins at step 410, where order fulfillment system 115 scans a QR code and retrieves an order number. As discussed, the order fulfillment system 115 may include QR scanner 114 which is configured to scan a QR code and extract data from the QR code. KMS 116 then parses the extracted data for the order number, which is sent to POS 118 for further processing.

At step 420, order fulfillment system 115 retrieves customer music preferences from order processing backend 108. In one embodiment, POS 118 may transmit the order number extracted from the QR code to order processing backend 108 and request music preferences information as well as information needed to fulfill the order. In one embodiment, the processing backend 108 queries a customer preferences database 110 to retrieve music preferences associated with the particular customer who placed the order (who may be identified by, e.g., a customer number associated with the order number in an order database). The order processing backend 108 may return the retrieved customer music preferences, along with order details needed to fulfill the order, in any feasible form (e.g., as an XML file). As discussed, the music preferences information may include any information identifying music that the customer likes or is predicted to like. For example, the music preferences information may identify a specific track or tracks, as well as identify a favorite band, artist, genre of music, time period, song, etc. The customer's music preferences may be determined in various ways, such as by explicitly asking the customer during a registration process, extracting the music preferences from an online profile belonging to the customer, matching a customer's age to music from an associated time period, among other things. For example, music preference information may be inferred from the customer's year of birth (e.g., 1980s music for a customer born between 1970 and 1990, hip hop for a customer born after 1990, etc.). As another example, music preferences may be gleaned from a mobile device playlist or ringtones, or based on keyword analysis of the customer's recent messages and email. Any metadata may be used as music preference indicators, including specific albums, movies, books, favorite instruments, hobbies, etc.

Note, in an alternative embodiment, the customer's music preferences may be encoded in the QR code, such that step 420 does not need to be performed. For example, order processing backend 108 may generate, in response to an order being placed via customer interface 104, a QR code that includes the order number as well as music preferences information (or a reference to such information). In such a case, order fulfillment system 115 may simply scan the QR code and extract the music preferences information.

At step 440, order fulfillment system 115 requests to add a music track matching the customer music preferences and current playlist to a queue of streaming media tracks. For example, streaming music backend 120 may provide an application programming interface (API) which KMS 116 (or other component of the order fulfillment system 115) invokes to request the music track. After KMS 116 invokes such an API to make the request, streaming music backend 120 may determine a music track that matches the customer music preferences and the current playlist, and add such a music track to the queue if the music track is not already in the queue, as discussed in greater detail below with respect to FIG. 5.

Figure 5:
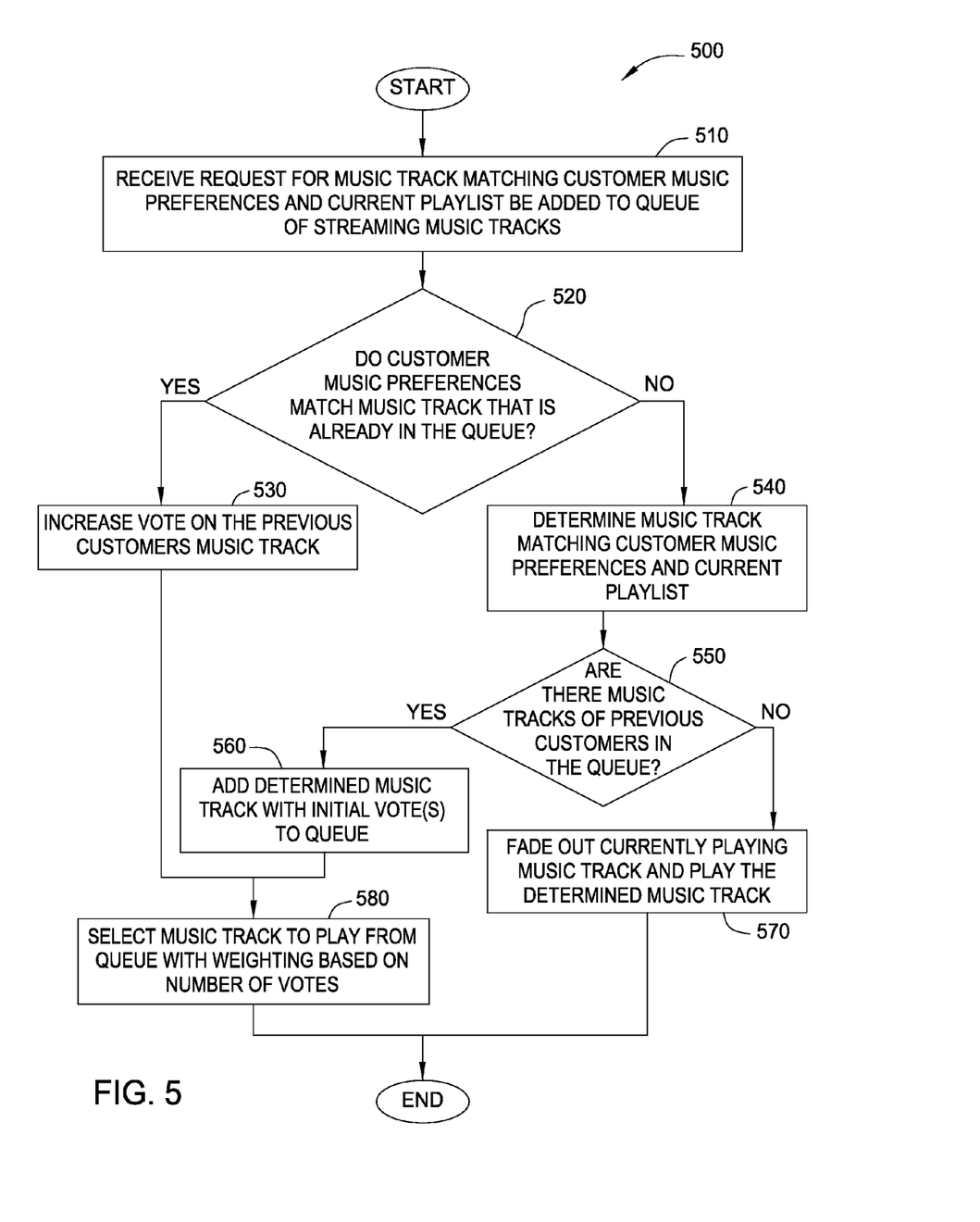
FIG. 5 is a flow diagram illustrating a method for queuing music matching customer preferences to an in-store playlist based on the presence of a given customer, according to one embodiment.

FIG. 5 is a flow diagram illustrating a method 500 for queuing music matching customer preferences, according to one embodiment. As shown, the method 500 begins at step 510, where streaming music backend 120 receives a request to add a music track matching customer music preferences and a current playlist to a queue of streaming music tracks. Such a request may be made by KMS 116 during an order fulfillment process, as discussed above with respect to FIG. 4.

At step 520, streaming music backend 120 determines whether the customer music preferences match a music track that is already in the queue. A "match" may be defined in a number of different ways in addition to a specific match for a specific track and techniques are known for mapping music preference information such as a favorite band or genre to specific music tracks. For example, the music tracks may be labeled by genre, subgenre, time period, etc., and streaming music backend 120 may search for a matching music track in the related genre, subgenre, time period, etc. that the customer prefers. If no such music track is found, streaming music backend 120 may also look beyond the favorite band itself to determine whether, e.g., a music track by a related band is in the queue. Of course, if the music preferences information does not include a favorite band or includes other information (e.g., favorite genre, time period, song, etc.), streaming music backend 120 may determine a match, as appropriate, using available information.

If the customer music preferences match a music track already in the queue, then at step 530, streaming music backend 120 increases a vote on the matching music track (e.g., by one vote or two votes). As discussed, voting may be used in choosing a next media track. In particular, the streaming music backend 120 may choose the next media track randomly from the music tracks in the queue, with each music track having a weighted chance of being picked based on the number of votes associated with the music track. In one embodiment, each music track in the queue associated with a customer may also have two or more votes. Other music tracks in the queue that belong to a playlist created by the restaurant, but are not associated with any particular customer, may have zero votes (or perhaps one vote). The number of votes for a given music track may be incremented by any value each time a customer's music preferences match the music track.

A broad variety of other schemes for voting and ranking can be used. For example, the current customer may be a repeat customer or other very important person (VIP) such as a celebrity who the restaurant wishes to reward for his/her patronage, and the streaming media backend 120 may prioritize such customers by increasing the number of votes on their matching music tracks by two (or by some other amount corresponding to a perceived value or status of a customer). In such a case, the order XML and order processing backend 108, discussed above, may be also modified, as appropriate, so that information about repeat customers and VIPs is stored and repeat customers and VIPs are recognized. As another example, the music tracks may be streamed based on uniqueness of the music tracks, such that a music track that is less commonly preferred is prioritized over more commonly preferred music tracks. This may result in a more memorable experience for customers who prefer uncommonly preferred music. On the other hand, customers who prefer commonly preferred music may not even notice if such a music track is played, as the music track may often be included in playlists.

Referring again to method 500, at step 540, if the customer music preferences do not match a music track already in the queue, streaming music backend 120 determines a music track matching the customer music preferences and the current playlist from other available music tracks. The other available music tracks may include music tracks in the restaurant's custom library of music tracks, music tracks in a comprehensive library of licensed music, etc. Identifying a music track that both matches customer preferences and the current playlist helps ensure that the music track chosen is not only appreciated by the customer, but also fits the current ambiance of the restaurant. Similar to the discussion above, a "match" may be defined in a variety of ways, and techniques are known for mapping music preference information to specific music tracks.

At step 550, streaming music backend 120 determines whether music tracks associated with other customers present in the restaurant remain in the queue. If not, then at step 560, streaming music backend 120 fades out the currently playing music track and plays the determined music track that matches the customer preferences and the current playlist. That is, streaming music backend 120 immediately begins to stream the determined music track for playback at the establishment after cutting short the currently playing music track by fading it out.

If music tracks associated with previous customers are present in the queue, then at step 570, streaming music backend 120 adds the determined music track with an initial vote value (e.g., two votes) to the queue. That is, music tracks that match customer preferences are not cut short. Accordingly, if streaming music backend 120 determines that music tracks associated with previous customers are in the queue, then the music track that matches the customer preferences and current playlist may be placed in the queue along with the tracks of previous customers. In another embodiment, the customers' music tracks may be played in first-come first served order.

Then, at step 580, the streaming music backend 120 selects a music track from the queue to play, with weighting of the selection based on the number of votes for each music track. That is, the queue may include a set of media tracks from which the streaming music backend randomly chooses a next media track. The next media track to be streamed for playback (becoming the currently streamed song) is then chosen randomly from the music tracks in the queue, with each music track having a weighted chance of being picked based on the number of votes associated with the music track. In an alternative embodiment, the queue itself may be sorted by the number of votes for each music track such that music tracks with more votes are played before music tracks with fewer votes.

Although discussed above primarily with respect to a QR code, customer presence and purchase may be determined in other ways. In general, any identifiable piece of information may be used that permits linking a customer who is present or makes a purchase to an entry in the customer preferences database. For example, the order fulfillment system may determine customer presence based on facial recognition, in response to detecting at the restaurant a mobile device MAC address known to belong to the customer's device, when the customer uses a check-in application, etc. or any combination of such techniques. The order fulfillment system may determine a purchase by the customer using credit card information, radio frequency identification (RFID) or some other near-field communication method, a unique order profile (i.e., a unique combination of items ordered) associated with the customer, etc. or any combination of such techniques. In one embodiment, customer presence and purchase may even be determined based on input by an operator of the establishment. For example, the operator may recognize a repeat customer and enter his/her name in the system. In cases where o, customer presence, but not purchase, is detected, the system may also adjust the music played according to the customer's music preferences, similar to the discussion above. For example, if a customer is present but has not made a purchase, the streaming music backend may increase the vote on a matching music track in the queue discussed above, and after the customer makes a purchase, the streaming music backend may increase the vote again by one. Conversely, a "VIP" customer, however identified, may have more votes assigned to selections added to the queue in response to their presence in a restaurant.

Although discussed above primarily with respect to ordering music tracks in a queue by a number of votes, techniques disclosed herein may be modified so that the music tracks are ordered according to other mechanisms. For example, the streaming music backend may aggregate preference data for all customers in the restaurant at a given time and make intelligent track selection and queuing decision based on those aggregated preferences.

Although discussed above primarily with respect to playing music, techniques disclosed herein may be modified so that adjustments to a customer's experience other than the music being played are made in response to detecting the customer's presence or purchase at a restaurant. That is, other in-store experiences, including any audio or visual media, may be changed upon detecting the customer's presence or purchase. For example, in response to detecting the customer's presence or purchase, the order board discussed above, which displays the status of orders, may also display customer-specific information, images (e.g., artwork or scenic photos), videos, etc.

Note, persons skilled in the art will recognize that embodiments disclosed herein may be modified as a result of various practical limitations. For example, digital rights management (DRM) restrictions may provide that a music track cannot be replayed within a certain time period, and that a limited number of songs may be cut short within any given hour. As another example, if a customer scans his/her order just before the end of a music track, the streaming media backend may not have enough time to pre-cache a music track matching the customer's preferences before the currently playing music track completes. Some streaming media services only play a media track in the queue that has loaded a sufficient enough cache to stream at the available bandwidth of an establishment's internet connection so as to not interrupt music service.

Advantageously, techniques disclosed herein permit customers' experiences at an establishment to be customized in a favorable manner. For example, music that customers like may be played at the establishment without requiring customers to explicitly select the music tracks, or even be aware that music tracks are being selected according to their preferences. Customers may feel more comfortable and enjoy the ambience of the establishment more given that music they appreciate is played when they are present. In addition, such music may be played as a reward for making a purchase.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as compact disc read only memory (CD-ROM) disks readable by a CD-ROM drive, flash memory, read only memory (ROM) chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense. In particular, the techniques described herein may be applicable to a wide variety of business outside of those discussed herein, including, for example, big box retail locations, boutique stores, concert, theater, movie or other entertainment venues, spas or beauty salons, and so forth.

Therefore, the scope of embodiments of the present invention is set forth in the claims that follow.

What is claimed is:

1. A computer-implemented method for selecting media for playback, display, or broadcast at an establishment, the method comprising:
   detecting a presence of a customer at the establishment based on receiving a scan of a graphical code from the customer; and
   in response to detecting the presence of the customer:
      associating the customer with an order to purchase non-media goods or services from the establishment,
      extracting media preferences associated with the customer from the graphical code, via operation of one or more processors, and
      identifying at least one media item corresponding to the extracted media preferences to playback, display, or broadcast at the establishment.

2. The method of claim 1, further comprising, playing, displaying, or broadcasting the at least one media item at the establishment.

3. The method of claim 2, wherein the at least one media item is played, displayed, or broadcast based on at least one of a ranking of the customer relative to other customers at the establishment and content of the media item.

4. The method of claim 1, wherein the at least one media item is one of a music track, an image, and a video.

5. The method of claim 1, wherein the at least one media item is a music track determined based on at least music preferences associated with the customer and a current playlist of music tracks queued to be played at the establishment.

6. The method of claim 5, further comprising:
   if the determined music track is present in the queue of music tracks to be played at the establishment:
   increasing a vote associated with the music track in the queue of music tracks; and
   if the determined music track is not in the queue of music tracks to be played at the establishment:
   adding the music track corresponding to the music preferences to the queue with an initial vote value or, if no music tracks in the queue are associated with the other customers, fading out a currently playing music track and playing the music track corresponding to the music preferences associated with the customer.

7. The method of claim 1, wherein the extracted media preferences associated with the customer are retrieved from a preferences database which stores preferences provided during a registration process.

8. The method of claim 1, wherein the presence of the customer is determined while processing, at the establishment, an order placed via an online customer interface.

9. A system, comprising:
a processor; and
a memory storing one or more application programs executed on the processor and configured to select media for playback, display, or broadcast at an establishment, by performing the steps of:
   detecting a presence of a customer at the establishment based on receiving a scan of a graphical code from the customer; and
   in response to detecting the presence of the customer:
      associating the customer with an order to purchase non-media goods or services from the establishment,
      determining media preferences associated with the customer based on the order to purchase non-media goods or services,
      identifying at least one media item corresponding to the determined media preferences to playback, display, or broadcast at the establishment,
      wherein the at least one media item is a music track determined based on at least music preferences associated with the customer and a current playlist of music tracks queued to be played at the establishment, and
      when the determined music track is present in the queue of music tracks to be played at the establishment, increasing a vote associated with the music track in the queue of music tracks.

10. The system of claim 9, the steps further comprising, playing, displaying, or broadcasting the at least one media item at the establishment.

11. The system of claim 10, wherein the at least one media item is played, displayed, or broadcast based on at least one of a ranking of the customer relative to other customers at the establishment and content of the media item.

12. The system of claim 9, wherein the at least one media item is one of a music track, an image, and a video.

13. The system of claim 9, the steps further comprising:
   if the determined music track is present in the queue of music tracks to be played at the establishment:
      increasing a vote associated with the music track in the queue of music tracks; and
   if the determined music track is not in the queue of music tracks to be played at the establishment:
      adding the music track corresponding to the music preferences to the queue with an initial vote value or, if no music tracks in the queue are associated with the other customers, fading out a currently playing music track and playing the music track corresponding to the music preferences associated with the customer.

14. The system of claim 9, wherein the media preferences associated with the customer are retrieved from a preferences database which stores preferences provided during a registration process.

15. The system of claim 9, wherein the presence of the customer is determined while processing, at the establishment, an order placed via an online customer interface.

16. A non-transitory computer-readable medium storing program instructions that, when executed by a processing unit, cause the processing unit to select media for playback, display, or broadcast at an establishment, by performing the steps of:
   detecting a presence of a customer at the establishment based on receiving a scan of a graphical code from the customer; and
   in response to detecting the presence of the customer:
      associating the customer with an order to purchase non-media goods or services from the establishment,
      extracting media preferences associated with the customer from the graphical code, via operation of one or more processors, and
      identifying at least one media item corresponding to the extracted media preferences to playback, display, or broadcast at the establishment.

* * * * *